Nov. 4, 1958  R. G. RIDEOUT  2,858,628
TRANSPARENCY VIEWER DEVICE
Filed Jan. 15, 1954  4 Sheets-Sheet 1

INVENTOR.
Richard G. Rideout
BY
M. W. Hamilton
ATTORNEY

Nov. 4, 1958 R. G. RIDEOUT 2,858,628
TRANSPARENCY VIEWER DEVICE
Filed Jan. 15, 1954 4 Sheets-Sheet 2

INVENTOR.
Richard G. Rideout
BY
M. H. Hamilton
ATTORNEY

Nov. 4, 1958  R. G. RIDEOUT  2,858,628
TRANSPARENCY VIEWER DEVICE
Filed Jan. 15, 1954  4 Sheets-Sheet 3

INVENTOR.
BY Richard G. Rideout
M. N. Hamilton
ATTORNEY

Nov. 4, 1958 R. G. RIDEOUT 2,858,628
TRANSPARENCY VIEWER DEVICE
Filed Jan. 15, 1954 4 Sheets-Sheet 4

INVENTOR.
BY Richard G. Rideout
M. H. Hamilton
ATTORNEY

United States Patent Office 2,858,628
Patented Nov. 4, 1958

2,858,628

TRANSPARENCY VIEWER DEVICE

Richard G. Rideout, Cambridge, Mass.

Application January 15, 1954, Serial No. 404,369

17 Claims. (Cl. 40—79)

This invention relates to an improved method and apparatus for veiwing photographic prints and more particularly colored prints of the so-called "Kodachrome Transparency" type in which colored slides are produced from exposed color negatives and the prints are then mounted in supporting frames of thin paper or other suitable material.

In holding color slides in a viewing position and moving the slides in to and out of register with conventional optical viewing apparatus, it is customary to manually locate individual slides in a receptacle which registers with the optical device. After the slide has been viewed it is manually removed from the receptacle and thereafter replaced by another slide. This operation is time consuming, detracts materially from the utility of the viewing device, and often times results in damage to the print surface. Moreover, to a great many hobbyists who follow the practice of collecting and storing a considerable number of slides in stacked relationship and who want the slides to occur in a desired sequence, there is involved a somewhat tedious operation of handling individual slides to keep them in the desired sequential relationship during and after the viewing operation.

An object of the present invention is to deal with the problem indicated and to devise improved methods and apparatus for handling and viewing photographic subject matter. Another object of the invention is to provide a means for mechanically feeding colored slides in to register with an optical viewing device and also to simultaneously eject slides which have been viewed. Another object is to devise a mechanical handling device which will hold a stack of slides and feed the slides from a stack and store the viewed slides in another stack and in the same sequence. A further object is to provide an improved slide magazine structure. Still another object is to devise a slide viewer which is simple to operate; which prevents individual slides from sticking to one another; and which can be very quickly and cheaply constructed.

These and other objects and novel features will be more fully understood and appreciated from the following description of a preferred embodiment of the invention selected for purposes of illustration and shown in the accompanying drawings, in which Fig. 1 is a plan view of the viewer of the invention;

Figure 1:
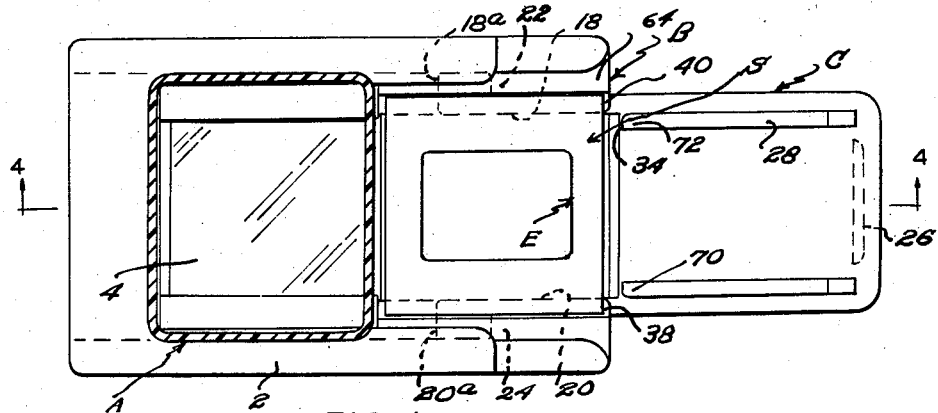

In accordance with the invention I have discovered an improved method of handling colored slides which includes the steps of supporting stacked slides in close juxtaposition with respect to an optical viewing apparatus and then successively feeding slides from the stack in to the viewing apparatus so that each feeding operation is accompanied by simultaneous ejection of a slide already viewed, and the ejected slides are collected in stacked relationship in a suitable storage magazine.

I am aware that various devices have been proposed in the art involving the use of a slide carrier for repetitively advancing slides in to register with an optical viewing apparatus. However, I have discovered a novel method of advancing slides and especially holding slides in permanently stacked relationship; and I have devised special magazine structures which may be used as a means for holding stacked slides in position for feeding, and also as a means for receiving slides ejected from the viewing apparatus, and preferably two of these magazine structures are intended to be employed simultaneously.

I have further devised a method of gravity feeding and I have designed a slide base structure which may be detachably secured to one of the slide magazines referred to in order to facilitate the gravity feeding operation.

I have still further discovered a method of feeding slides from a stack in a novel manner in which the upper surface of the lowermost slide in the stack and the adjacent surfaces of the slide occurring immediately above it are separated from one another to facilitate sliding movement of the two said surfaces and to prevent especially any interference or locking together of an edge of one slide with a projecting edge of the other slide.

The apparatus illustrated in the drawings generally comprises a slide base; an optical viewing apparatus mounted on the slide base; slide magazine means for supporting a stack of slides in close juxtaposition to the optical viewing apparatus, and a slide carrier member for selectively feeding slides from the bottom of the stack to the optical viewing apparatus.

The slide base has been generally denoted by the arrow B and comprises a relatively thin body portion 2 which may convenietly be formed of a plastic, metal, or other suitable material, preferably in a shape such as that indicated in Figs. 1 to 4, inclusive. The body portion 2 of the base is formed with a viewing aperture 6 (Fig. 4) and secured in register with this aperture 6 at the under side of the body portion is a translucent window 4 which may, for example, be detachably held in position by lug portions 8 and 10.

Mounted on the upper side of the slide base B, and also in register with the viewing aperture 6, is an optical viewing apparatus of a conventional magnifier type, generally denoted by the arrow A and including a lens 12 and means for adjusting the lens in the well known manner. Preferably, the outer casing of the optical apparatus A may be permanently fixed to the slide base although, if desired, it may be removably secured.

In accordance with the invention I form the body portion 2 with a series of stepped channels or guideways occurring in pairs, one above another, and extending longitudinally along two opposite sides of the body portion. These guideways include a pair of guideways for a slide carrier element; another pair of guideways along which the edges of a slide may be guided; and, finally, a third pair of guideways for detachably securing slide magazine means.

Numerals 14 and 16 note the lowermost pair of guideways and in these spaces are slidably mounted two guide arms 18 and 20, which form a part of a slide carrier element generally denoted by the arrow C. The guide arms are indicated in dotted lines and one of the arms has been more clearly shown in Fig. 4. As noted in the latter figure the extremities of these guide arms are formed with projecting portions 18a and 20a which are adapted in the extended position of the slide carrier shown in Fig. 1, to come into abutment with stops 22 and 24 formed internally of each of the guideways 14 and 16 and consisting of forwardly projecting shouldered portions, as may be more clearly shown in Fig. 4. In the position noted in Fig. 4 it will be seen that the carrier element cannot be moved to the right any further.

Figure 2:
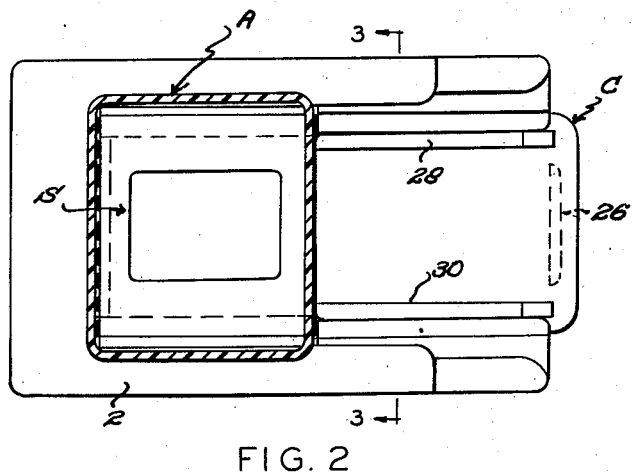
Fig. 2 is a view similar to Fig. 1 but showing a slide carrier element of the viewer in an advanced position.
Figure 4:
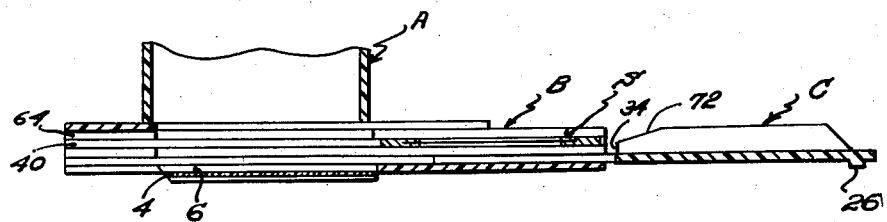
Fig. 4 is a cross-section taken on the line 4—4 of Fig. 1.
Figure 5:
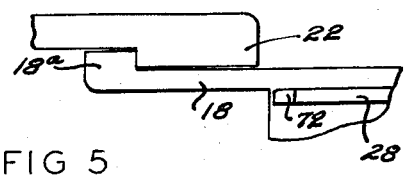
Fig. 5 is a detailed fragmentary plan view of a part of the slide carrier element of the invention.

The guideways 14 and 16 extend along the slide base for a distance sufficient to permit the slide carrier C to move into a position such as that shown in Fig. 2, for example. This forward position of the slide carrier C, it will be noted, is limited by the abutment of a stop element 26 which is formed at the under side of the slide carrier, as shown in Figs. 1, 2 and 4. The stop 26 is of a size such that it projects downwardly into engagement with the bottom of the slide base, as shown.

The slide carrier C is provided with two slide actuating ramps 28 and 30 occurring in spaced-apart relation along two opposite sides of the slide carrier, as shown in Figs. 1 and 2, and in a position such that they may pass freely by the guideways 14 and 16.

At the left-hand end of the slide carrier C, as viewed in Figs. 1 and 2, the space between the guide arms 18 and 20 forms a slide aperture. When a slide member S is supported on the slide base and the slide carrier is advanced, the print portion of the slide will fall into register with the slide. The two ramps 28 and 30 are formed at their left-hand extremities, as viewed in Fig. 1, with vertical abutment surfaces 32 and 34, and these abutment surfaces are of a thickness greater than the spacing of the guideways 14 and 16 so that these abutment surfaces can move into engagement with the rearmost edge of a slide S when supported in guideways 38 and 40, in a position such as that shown in Figs. 1 and 4.

By means of the structure described it will be apparent, therefore, that a slide may be manually placed on the slide base between the guide arms 18 and 20, with the slide carrier element in the position shown in Fig. 1.

Thereafter the slide carrier may be moved in a direction from right to left, as viewed in Fig. 1, and the slide S will be guided along the guideways 38 and 40 into a position of register with the viewing apparatus A. Where so desired, therefore, the structure now described may be used for manually handling slides and advancing them, one by one, into register with the member A. In such a case slides pass along the guideways 38 and 40 and at one point travel over the ends of lower surfaces of these guideways and fall away from the slide base.

Figure 6:
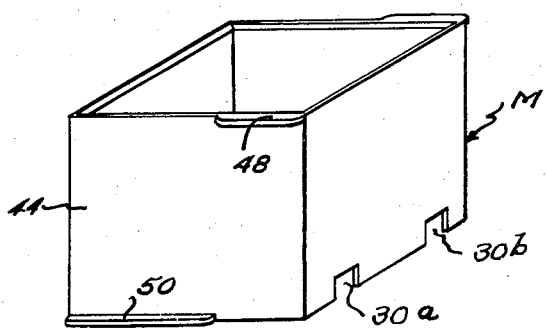
Fig. 6 is a perspective view of a slide magazine element of the invention.
Figure 7:
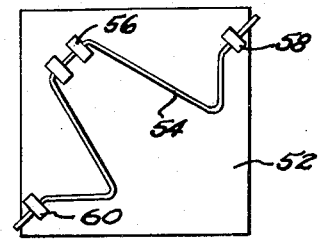
Fig. 7 is a plan view of a detachable cover element for the slide magazine member shown in Fig. 6.
Figure 8:
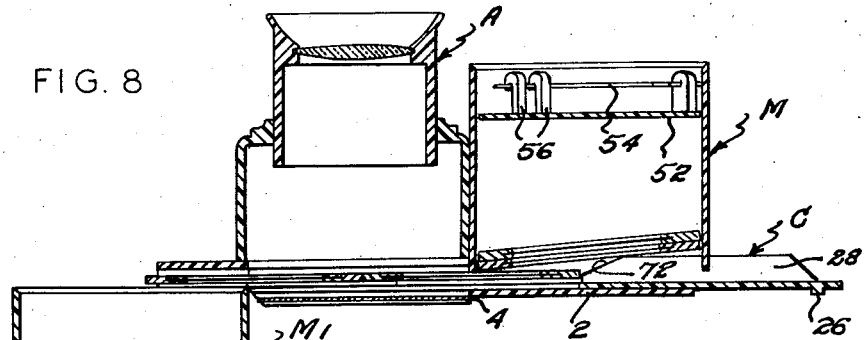
Fig. 8 is a symmetrical cross-sectional view of the viewer of the invention shown with slide magazines of the invention attached in position to carry out both slide feeding and slide storing operations simultaneously.

In accordance with a preferred embodiment of the invention where it is desired to deal with stacks of slides, I have devised the stacking magazine means earlier referred to by which a plurality of slides may be held in permanently stacked relationship. Attention is directed to Figs. 6 to 8, inclusive, wherein there is shown the magazine denoted by the arrow M and consisting of a tubular enclosure formed of side walls, as 50, and open at either end. At two opposite sides of the tubular enclosure along a lower edge thereof are formed a pair of relatively long guide ribs, as 50, and similarly, at the top rear portion of the tubular enclosure are provided a pair of relatively short guide rib members, as 48. Arranged to slidably fit within the sides of the tubular enclosure is a closure member 52.

This closure member may be disposed at either the top or bottom of the tubular enclosure end and, if desired, two of the closure members may be employed to constitute both a top and a bottom for the magazine end. As noted in Fig. 7, the closure member is provided with a spring 54 bent in the manner shown and held at intermediate portions by means of hooked brackets 56. Opposite ends of the spring are slidably supported by a pair of offset brackets 58 and 60 which preferably are located on different center lines to facilitate molding procedures where it is desired to form the closure members from plastic materials.

It is contemplated that this magazine member may constitute a container or case for either transporting, storing, or shipping the slides, if so desired, and where such a function is to be carried out, both ends of the tubular body may be closed by means of two of the closure plates described, and thereby a stack of slides of any desired size may be held in place within the magazine.

Figure 3:
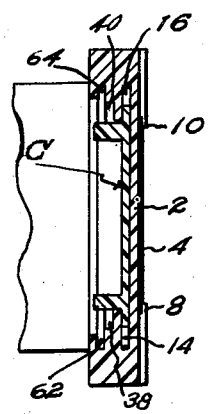
Fig. 3 is a cross-section taken on the line 3—3 of Fig. 2.

When, however, the magazine is to be employed for the primary purpose of feeding slides to the slide base, the relatively long guide ribs 50 are slidably inserted in the guideways 62 and 64, best shown in Figs. 1, 3 and 4. The arrangement of parts may be conveniently chosen such that when the magazine has been slidably fitted into the guideways 52 and 64, the forward wall of the magazine will come into abutting relationship with the adjacent surface of the optical apparatus A in a position such as shown in Fig. 8. In this position of abutment a lowermost slide carried by the magazine occurs in a position of register with the slide aperture between the arms 18 and 20, and the slide, when released from the magazine, becomes supported on the lower surface of the guideways 38 and 40, as may be observed from an inspection of Fig. 1.

With the magazine M engaged in the position described, and with the slide carrier C in the loading position shown in Fig. 1, release of the lowermost slide is carried out by simply turning the slide base and magazine into a position such that the stack is in an upright position, gravity will then cause the bottom slide to drop down onto the lower surfaces of the guideways 38 to 40, as may be observed from an inspection of Fig. 1. The slide base and magazine are temporarily held with the stack upright.

When the slide S is in the position of Fig. 1 its rearmost edge will extend slightly above the forward edge 34 of the carrier C, as earlier noted and shown in Fig. 4. It will be obvious that upon advancing the slide carrier from right to left (Fig. 4) in a substantially horizontal path, it will engage against and move the slide S into the position which has been illustrated in Fig. 2 where the slide becomes registered with the optical device A. Forward movement of the slide carrier is limited by the stop 26 meeting an edge of the slide device or base and the slide is in viewing position.

The entire assembly may then be turned through an arc of 90° and the optical apparatus A placed against the eye of the observer for more conveniently viewing the subject matter of the slide. In order to view succeeding slides it is necessary to eject the slide in the optical apparatus A and to reload the slide carrier C from the feed stack. These two objectives are achieved by turning the base and magazine back into a position such that the feed stack is again upright. Then the slide carrier is retracted to the Fig. 1 position and gravity acts to release another slide. In this case the released slide falls into a position immediately in back of the slide of the optical apparatus A. Slight forward movement of the slide carrier C then brings two slides into abutting relationship, and both slides move from right to left until the new slide is placed in viewing position. Simultaneously, the viewed slide is ejected and passes out through the guideways, the lower surfaces of which are terminated, as noted above and also as shown in Fig. 8.

The ejected slide is caused to fall directly into a second magazine M1, as suggested in Fig. 8. This magazine is similar to the magazine M but is attached at the lower side of the slide base by means of the relatively short ribs 48 in guideways 14 and 16. It is pointed out that this gravity controlled movement of both the new slide to be viewed and the ejected slide, results in the same sequential arrangement of the slides being maintained, and when it is desired to again view the slides in the magazine M1, it is merely necessary to remove the closure member 52a from the bottom of the stack of blades and attach this member to the base. This magazine interchangeability is an outstanding and novel feature of the invention.

Another important feature of the invention has to do with specially devised means for preventing interference in sliding movement of adjacent slides, one against another, while in stacked relationship. It has been found that in dealing with stacks of slides where the slides are necessarily maintained against one another, either by spring pressure or by the action of gravity, there may, in some instances, develop a troublesome interference or interlocking of certain edges of the slides. Careful study of the problem has revealed the fact that the inner print edges of the slides, such as indicated, for example, by the edge E, in Fig. 1, is usually the source of trouble. Apparently what may happen is that an edge, such as the edge E, becomes warped or buckled either from bending or excessive drying of the slide, or for some other reason, and then the edge tends to arch upwardly or outwardly into a position where an edge of another slide may engage against it and further sliding movement is prevented temporarily.

Figure 9:
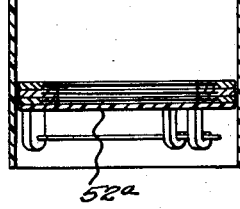
Fig. 9 is a fragmentary cross-sectional view of a slide magazine showing the slide carrier moving into contact with a stack of slides in one position.
Figure 10:
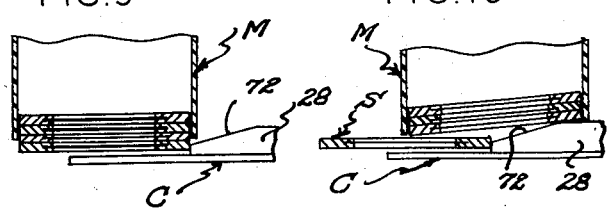
Fig. 10 is a view similar to Fig. 9 but further illustrating the slide carrier in another position of adjustment relative to a stack of slides.

As one solution of this problem, I have devised a method of lifting or separating upper slides of the stack slightly away from the bottom slide at the particular point at which this bottom slide is picked off and moved into a viewing position by means of the slide carrier. In this way any possible interference or locking between raised edges can, I find, be prevented. In producing the lifting or separating action I have devised a special ramp structure, as shown in Figs. 1, 2, 4 and 8. This ramp structure includes two enlarged ramp portions which terminate in bevelled surfaces 70 and 72. These bevelled surfaces are chosen so that they will slide under the rearmost edge of the slide occurring immediately above a bottom slide, as has been suggested in Figs. 9 and 10. By extending the bevelled ramp surfaces sufficiently high, it will be apparent that it can be caused to lift the stack into an inclined position such as that shown especially in Figs. 8 and 10.

To permit movement of the enlarged ramps through the magazine M, the latter member has been further formed with slots, as 30a and 30b, better shown in Fig. 6. This arrangement has been found to constitute one suitable means of preventing interference. However, it is intended that the method of separating a bottom slide from the rest of the slides in a stack, while the bottom slide is moving forwardly, may be carried out in other desirable ways, utilizing other structures.

Figure 12:
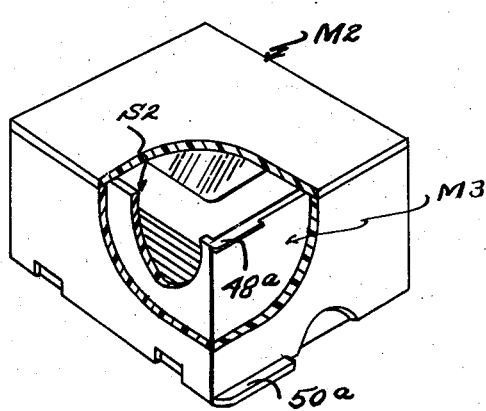
Fig. 12 is a perspective view of another form of slide magazine structure partly broken away to show the details of two magazine elements with a stack of slides contained therein.

In Figs. 12 to 17, inclusive, I have illustrated another desirable form of the invention, including especially a combination feed magazine and storage magazine which may be fitted, one within the other, in the manner shown in Fig. 12. The feed magazine is denoted by the arrow M2 and the storage magazine is indicated by the arrow M3. Ribs or guide edges 50a are provided on the feed magazine M2 and similar guide edges 48a are provided on the storage magazine M3 for attaching these members at respective front and rear portions of a slide base B1. A slide carrier C1 is slidably supported in the slide base B1 in guideways in the manner already described.

Figure 13:
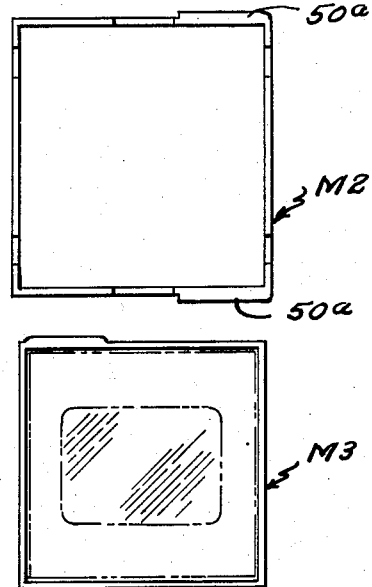
Fig. 13 is a plan assembly view showing the two magazine elements separated, one from the other, and suggesting a slide in the lower magazine element.

The magazine M2 is larger than the magazine M3, as shown in an assembly view of Fig. 13 so that the latter member may slide into the magazine M2, as suggested in Fig. 12, with there being sufficient clearance to prevent movement of the guide edges 48a in the magazine Ma.

A stacking of the slides S2 is normally held in the magazine M3 for storage purposes. However, to use the magazine M2 as a feed magazine, the unit shown in Fig. 12 is turned over upon itself so that all of the slides in stack S2 drop into the magazine M2. The latter member is then indicated at the upper side of the slide base member B1 in the position shown in Fig. 14 and the magazine M3 is attached at the lower side of the base B1, as also noted in Fig. 14.

Figure 14:
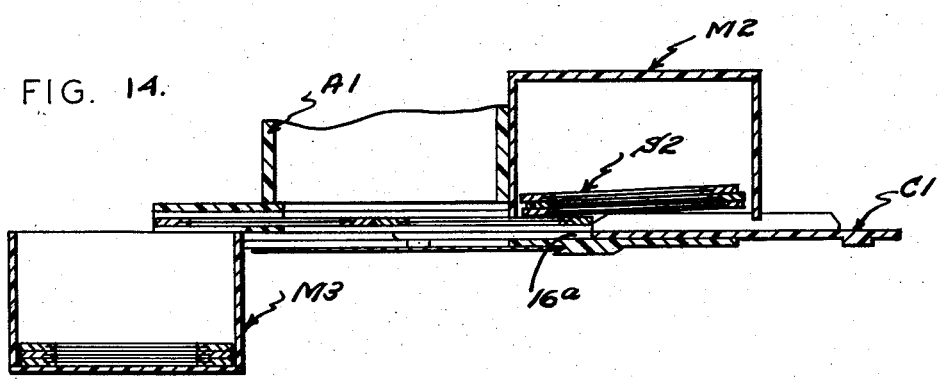
Fig. 14 is a vertical cross-sectional view similar to the cross-sectional view of Fig. 8 but showing the magazine elements of Figs. 12 and 13 associated with a slide base and a slide carrier of the type shown in Figs. 1 to 11, inclusive.

It will be observed that the relatively larger size of the magazine M2 makes it necessary to provide a slightly wider guideway into which the slides may drop from the stack, as shown in Fig. 14. Otherwise the slide may tend to have one edge fall below one of the slide guideway surfaces. To provide a suitable width and take care of this problem, I have devised the guideways 16a which are chosen of a sufficient width to slidably receive the guide edges 50a of the magazine M2. Immediately above these guideways I provide converging slide guideways 38a and 40a which are relatively wide at portions occurring immediately below the magazine M2 and which have inwardly tapered sides beginning at points just in front of the optical viewing apparatus A1 shown in Fig. 15.

It is pointed out that by means of this variable width slide guideway arrangement it is possible to receive a slide dropped from the magazine M2 in any position determined by the sides of this member and the slide carrier C but will engage against and advance the slide in the manner already described. However, as the slide moves forwardly, one of its front corners will abut against one of the bevelled sides of the guide ways 38a and 40a and a lateral displacement of the slide takes place concurrently, with its further forward movement, until proper register of the slide with respect to the apparatus A1 is achieved.

Figure 15:
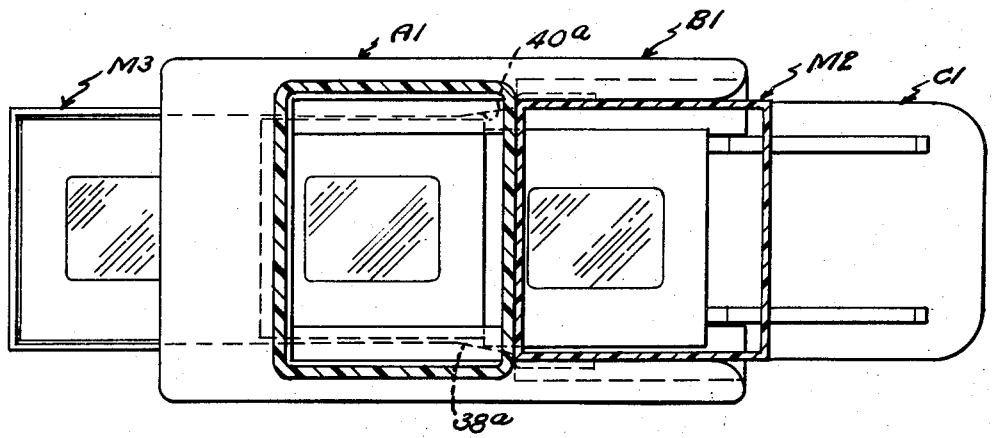
Fig. 15 is a plan cross-sectional view showing the magazine elements illustrated in Figs. 12 and 13 engaged with the carrier and slide base in one position of adjustment and further illustrating details of construction of the slide base which have been designed to receive these magazine elements.
Figure 16:
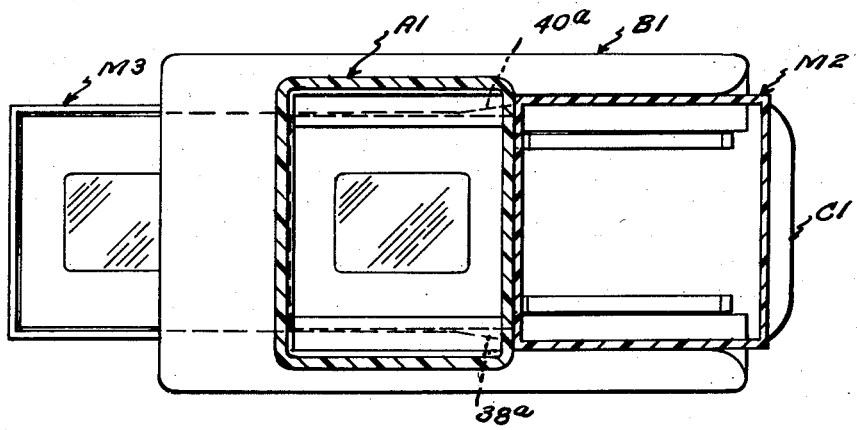
Fig. 16 is another plan cross-sectional view similar to Fig. 15 but showing the slide carrier in an advanced position in the slide base.
Figure 17:
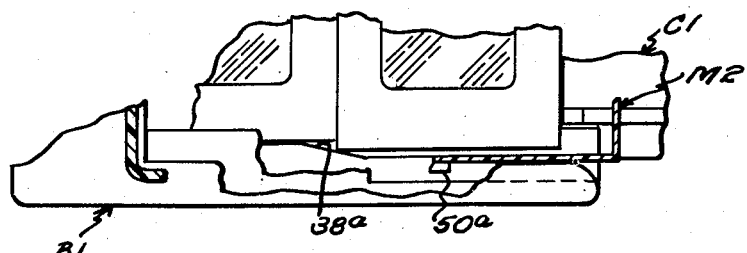
Fig. 17 is a fragmentary plan view, partly broken away along one side to further reveal details of construction of the guideways which are employed in guiding slides fed from the type of magazine shown in Figs. 15 and 16.

Fig. 15 hows a slide as it is being laterally displaced and Fig. 16 shows the same slide in a correctly registered position. Fig. 17 has been broken away to more clearly reveal the relation of the parts and the double section at the guideway 38a. All other operations are similar to those already described with ejected blades being collected in the magazine M3. It will be evident that once the slides are collected in the magazine M3 the magazine M2 may be used as a cover to close the member M3 and there is thus produced a unique storage container which can be used for holding and transporting slides in any desired number of sequences.

Figure 11:
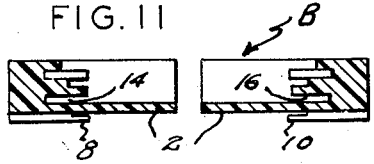
Fig. 11 is an assembly view showing in cross-section two molded parts of the slide base in a position to be assembled with the slide carrier.

It will be evident from the foregoing description of the invention that I have provided an improved method of handling slides in stacks involving a unique principal of gravity feeding and also gravity stacking of ejected slides. I have further introduced a novel magazine structure for containing and storing slides in a convenient packaged form in which the stacks of slides may be prepared, stored, and transported without manual handling of individual slides, and each slide, by means of the apparatus and method of the invention, may be passed through a viewing device with the stacked relationship of the slides being held constant at all times and especially with the sequence of the stacked slides remaining unchanged. Finally, I have provided a unique means of preventing interference in sliding movement of adjacent slides against one another. It should also be observed that the slide base and slide carrier structure may be very cheaply and conveniently manufactured by standard plastic molding operations, and in this connection the several parts may be conveniently assembled by forming the slide base in two halves, as shown in Fig. 11. While the halves are separated the slide carrier C may be put in place and the halves then brought together and cemented in the well known manner, and the optical viewing apparatus A can thereafter be applied on the assembled base.

While I have shown and described preferred embodiments of my invention, it should be understood that various other changes and modifications may be resorted to in keeping with the scope of the invention as defined by the appended claims.

Having thus described my invention, what I desire to claim as new is:

1. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation of the device, an abutment surface carried by and in normally fixed relation to said slide carrier for engaging an edge of the lowermost slide of said stack of slides while resting upon said pair of spaced supporting surfaces and for moving said lowermost slide laterally into register with said viewing aperture and said optical viewing means, and fixed means on said slide carrier arranged to elevate the remaining slides as said lowermost slide is being moved away from said stack and until said abutment surface is moved back substantially to its starting position.

2. A device according to claim 1, in which said base member adjacent said slide receiving and supporting location is provided with vertically extending walls forming a slide magazine for retaining a plurality of slides to be consecutively viewed in a vertically stacked arrangement.

3. A device according to claim 2, in which said slide magazine is provided with suitable attachment means for allowing said magazine to be readily attached to and detached from said base member.

4. A device according to claim 2 in which a second slide magazine is secured to said base member adjacent and below the ends of said slide supporting surfaces remote from said first magazine so as to receive and collect successive slides in the same stacked relation as initially provided said slides in said first magazine as they gravitate from the ends of said supporting surfaces.

5. A device according to claim 4, in which both of said slide magazines are provided with suitable attachment means for allowing said magazines to be readily attached to and detached from said base member.

6. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation of the device, an abutment surface formed on said slide carrier for engaging an edge of the lowermost slide of said stack of slides while resting upon said pair of spaced supporting surfaces and for moving same laterally into register with said viewing aperture and said optical viewing means, a slide magazine having openings at the top and bottom ends thereof, attaching means at each end of said slide magazine for selectively detachably securing one of said ends of said magazine to said base member at a dispensing location or the other end of said magazine to said base member at a slide receiving location adjacent said slide supporting surfaces, and a cover member removably secured to said slide magazine and closing the opposite open end of said slide magazine.

7. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending laterally of said base member for actuation of the device, an abutment surface formed on said slide carrier for engaging an edge of the lowermost slide of said stack of slides while resting upon said pair of spaced supporting surfaces and for moving same laterally into register with said viewing aperture and said optical viewing means, a pair of slide dispensing and collecting magazines of such a size as to fit one within the other when removed from said base member so as to serve for slide storage purposes, attaching means adjacent an open end of one of said slide magazines for detachably securing same to said base member in a slide dispensing position adjacent said slide receiving and supporting location, and attaching means adjacent an open end of the other of said slide magazines for detachably securing same to said base member in a position so as to receive and collect successive slides as same gravitate from the end of said supporting surfaces.

8. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation by a user of the device, an abutment surface formed on said slide carrier for engaging an edge of the lowermost slide of said stack of slides while resting upon said pair of spaced supporting surfaces and for moving same laterally into register with said viewing aperture and said optical viewing means, a pair of like interchangeable slide magazines having openings at the top and bottom ends thereof, one of said slide magazines having its bottom end removably secured to said base member at said slide receiving and supporting location to serve as a dispensing magazine, and the other of said slide magazines having its top end removably secured to said base member adjacent and below the ends of said supporting surfaces remote from said first magazine so as to receive and collect successive slides as they gravitate from the ends of said supporting surfaces, and a pair of like covers each removably fitting into and closing an open end of said slide magazines.

9. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation of the device, an abutment surface formed on said slide carrier for engaging an edge of the lowermost slide of said stack of slides while resting upon said pair of spaced supporting surfaces and for moving same laterally into register with said viewing aperture and said optical viewing means, and a tubular slide magazine detachably secured to said base member at said slide receiving and supporting location and serving to retain a plurality of slides to be consecutively viewed in a vertically stacked arrangement, a pair of opposite side walls of said tubular magazine at the bottom edges thereof terminating in spaced relation to said base member so as to allow said slide carrier to move laterally therebeneath as the lowermost slide is being moved from said magazine into register with said viewing aperture.

10. A device according to claim 9, in which both ends of said tubular member have openings of like size and shape therein so that a single cover may be used to close either opening, a cover removably mounted in one end of said tubular magazine, and spring actuated means on said cover for adjustably holding said cover within said tubular magazine.

11. A slide magazine for use in storing a plurality of transparency slides therein in an initial predetermined face-to-face adjacent relation to each other, and for use in dispensing such slides in a predetermined sequential order for display purposes in an associated optical viewing device, and for use in subsequently receiving from said device a similar second plurality of slides in like predetermined sequential order and like face-to-face adjacent relation as initially provided said first plurality of slides before the displaying thereof, said magazine being adapted to be operatively located in a vertical position on said device during use therewith and comprising a rectangular tubular body portion having top and bottom openings formed in its opposite ends, attaching means on said tubular body portion adjacent one of said ends for attachment to said optical device, and a pair of like removable cover members for closing said openings during storage, whereby a plurality of slides may be inserted into the top of said magazine and stored therein and subsequently dispensed from the bottom thereof without having a change in said face-to-face relation or in said sequential order occur therein.

12. A slide magazine for use in storing a plurality of transparency slides therein in an initial predetermined face-to-face adjacent relation to each other, for use in dispensing such slides in a predetermined sequential order for display purposes in an associated optical viewing device, and for use in subsequently receiving from said device a similar second plurality of slides in like predetermined sequential order and like face-to-face adjacent relation as initially provided said first plurality of slides before the displaying thereof, said magazine being adapted to be operatively located in a vertical position on said device during use therewith and comprising a tubular body portion having top and bottom openings formed in its opposite ends, attaching means of different shapes on said tubular body portion adjacent the bottom and top ends respectively thereof for selective attachment to said optical device respectively above and below the display position therein, and a pair of like removable cover members for closing said openings during storage, whereby a plurality of slides may be inserted into the top of said magazine and stored therein, subsequently dispensed from the bottom thereof, and thereafter another plurality of slides may be automatically inserted therein during use of the device and without having a change in said face-to-face relation or sequential arrangement of the slides of a plurality occur therein.

13. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation of the device, an abutment surface formed on said slide carrier for engaging an edge of the lowermost slide of said stack of slides resting upon said pair of spaced supporting surfaces, and for moving said lowermost slide laterally into register with said viewing aperture and said optical viewing means, a vertically extending tubular slide magazine secured to said base member at said slide receiving and supporting location and having an open upper end for receiving and retaining therein a plurality of slides which are to be consecutively viewed in said device, and an upwardly extending rib on said slide carrier arranged to engage a portion of the next-to-bottom slide of said stack of slides as said abutment surface moves the bottom slide laterally away from said stack, said rib serving to elevate at least portions of the next-to-bottom slide slightly relative to corresponding portions of said bottom slide at such time, whereby a space between parts of adjacent surfaces of said bottom slide and next-to-bottom slide will be effected during sliding movement of said bottom slide toward said viewing aperture.

14. A device according to claim 13, in which a second slide magazine having an opening in the top thereof is carried by said base member and positioned adjacent the free ends of said slide supporting surfaces so that successive slides thereon after reaching said free ends will gravitate into said second slide magazine.

15. A device for viewing photographic slides and the like comprising a normally horizontally disposed base member having a picture viewing aperture formed therein, a translucent window aligned with said aperture, an upwardly extending support carried by said base member, optical viewing means carried by said upwardly extending support so as to be in register with said aperture and window, an elongated pair of spaced photographic slide supporting and directing surfaces on said base member and disposed adjacent opposite sides of said aperture, said base member and said supporting surfaces thereon extending sufficiently laterally of said aperture so as to provide a slide receiving and supporting location to one side of said optical viewing means for accommodating a vertically arranged stack of slides when positioned thereon, horizontally extending guide means on said base member, a slide carrier slidably positioned in said guide means for transverse reciprocating movement, and having a part extending outwardly of said base member for actuation of the device, an abutment surface formed centrally of a forward part of said slide carrier for engaging, as said carrier starts to move toward said aperture, an edge of the lowermost slide of said stack of slides resting upon said pair of spaced supporting surfaces, and for moving said lowermost slide laterally into register with said viewing aperture and said optical viewing means, a vertically extending tubular slide magazine secured to said base member at said slide receiving and supporting location and having an open upper end for receiving and retaining therein a plurality of slides which are to be consecutively viewed in said device, and a pair of upwardly extending ribs on said slide carrier adjacent opposite side edges thereof arranged to engage a portion of the next-to-bottom slide of said stack of slides as said abutment surface moves the bottom slide laterally away from said stack, said ribs serving to elevate at least a portion of the next-to-bottom slide slightly relative to corresponding portions of said bottom slide at such time, whereby a space between parts of adjacent surfaces of said bottom slide and next-to-bottom slide will be effected during sliding movement of the bottom slide toward said viewing aperture.

16. A device according to claim 15, in which a second slide magazine having an opening in the top thereof is carried by said base member and positioned adjacent the free ends of said slide supporting surfaces so that successive slides thereon after reaching said free ends will gravitate into said second slide magazine.

17. A device for viewing photographic slides and the like comprising a normally horizontally disposed base member formed by a pair of elongated spaced side rails interconnected by a first thin transversely extending wall portion and a second thin transverse wall portion spaced therefrom so as to define a picture viewing aperture in said base member, each of said side rails having a plurality of parallel grooves formed therein, a translucent window aligned with said aperture, an upwardly extending support carried by said base member, optical viewing means carried by said upwardly extending support so as to be in register with said aperture and window, a first pair of said grooves in said side rails providing a pair of spaced photographic slide supporting and directing surfaces for said base member and disposed adjacent opposite sides of said aperture, said base member and said supporting surfaces thereon extending sufficiently laterally of said aperture, thereon extending sufficiently laterally of said aperture so as to provide a slide receiving and supporting location to one side of said optical viewing means for accommodating a vertically arranged stack of slides when positioned thereon, a second pair of said grooves in said side rails constituting horizontally extending guide means on said base member for opposite edge portions of a slide carrier, a slide carrier slidably positioned in said second pair of grooves for transverse reciprocating movement, and having a part extending outwardly of said base member for actuation of the device, and an abutment surface formed on said slide carrier for engaging an edge of the lowermost slide of said stack of slides while resting upon said pair of spaced supporting surfaces and for moving same horizontally into register with said viewing aperture and said optical viewing means, a tubular slide receiving magazine secured to said base member at said slide receiving and supporting location and serving to retain a plurality of slides to be consecutively viewed in a vertically stacked arrangement until moved one by one into said slide viewing position.

References Cited in the file of this patent

UNITED STATES PATENTS

| | | |
|---|---|---|
| 1,002,078 | Paoli | Aug. 29, 1911 |
| 1,218,277 | Knauf | Mar. 6, 1917 |
| 1,854,908 | Northup | Apr. 19, 1932 |
| 2,503,239 | Antos | Apr. 11, 1950 |
| 2,604,008 | Beekley | July 22, 1952 |
| 2,617,218 | Antos | Nov. 11, 1952 |